United States Patent
Hahn et al.

(10) Patent No.: US 10,321,504 B2
(45) Date of Patent: Jun. 11, 2019

(54) METHOD AND DEVICE FOR SEARCHING FOR ALTERNATIVE LINK IN WIRELESS COMMUNICATION SYSTEM

(71) Applicant: LG Electronics Inc., Seoul (KR)

(72) Inventors: Genebeck Hahn, Seoul (KR); Ilmu Byun, Seoul (KR); Heejeong Cho, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/554,058

(22) PCT Filed: Jul. 27, 2015

(86) PCT No.: PCT/KR2015/007812
§ 371 (c)(1),
(2) Date: Aug. 28, 2017

(87) PCT Pub. No.: WO2016/140410
PCT Pub. Date: Sep. 9, 2016

(65) Prior Publication Data
US 2018/0035369 A1 Feb. 1, 2018

Related U.S. Application Data

(60) Provisional application No. 62/128,486, filed on Mar. 4, 2015.

(51) Int. Cl.
*H04W 4/00* (2018.01)
*H04W 76/15* (2018.01)
(Continued)

(52) U.S. Cl.
CPC .......... *H04W 76/15* (2018.02); *H04W 24/10* (2013.01); *H04W 48/16* (2013.01); *H04W 72/12* (2013.01);
(Continued)

(58) Field of Classification Search
CPC ..... H04W 76/15; H04W 76/30; H04W 76/10; H04W 36/00; H04W 36/36
See application file for complete search history.

(56) References Cited

U.S. PATENT DOCUMENTS

2007/0149226 A1* 6/2007 de Vries ............... H04W 56/00
455/502
2010/0130206 A1* 5/2010 Chin ..................... H04W 36/30
455/436
(Continued)

FOREIGN PATENT DOCUMENTS

KR 10-2008-0086867 A 9/2008
KR 10-2010-0108464 A 10/2010
(Continued)

*Primary Examiner* — Barry W Taylor
(74) *Attorney, Agent, or Firm* — Dentons US LLP

(57) ABSTRACT

A method for searching for an alternative link by a terminal in a wireless communication system, according to an embodiment of the present invention, comprises the steps of: receiving from a serving link base station service information comprising a target quality value of a service to be provided to a terminal; determining whether or not a first alternative link is to be searched for on the basis of a reference scheduling quality value, which is to be used for scheduling the terminal in the future by the serving link base station, and the target quality value; if the first alternative link has been determined to be searched for, searching for candidate base stations for establishing the first alternative link; and establishing the first alternative link in a deactivation mode of unicast data transmission/reception with a first candidate base station among the candidate base stations.

14 Claims, 15 Drawing Sheets

(51) Int. Cl.
   *H04W 24/10* (2009.01)
   *H04W 88/08* (2009.01)
   *H04W 48/16* (2009.01)
   *H04W 72/12* (2009.01)
   *H04W 76/10* (2018.01)
   *H04W 76/30* (2018.01)
   *H04W 84/04* (2009.01)
   *H04W 88/02* (2009.01)

(52) U.S. Cl.
   CPC ............ *H04W 88/08* (2013.01); *H04W 76/10* (2018.02); *H04W 76/30* (2018.02); *H04W 84/042* (2013.01); *H04W 88/02* (2013.01)

(56) References Cited

U.S. PATENT DOCUMENTS

| | | |
|---|---|---|
| 2013/0183971 A1 | 7/2013 | Tamaki et al. |
| 2013/0229942 A1 | 9/2013 | Kubota |
| 2014/0056243 A1* | 2/2014 | Pelletier ................ H04W 74/04 370/329 |
| 2014/0092866 A1 | 4/2014 | Teyeb et al. |
| 2014/0213249 A1 | 7/2014 | Kang et al. |
| 2015/0065131 A1 | 3/2015 | Chuang |
| 2015/0163773 A1* | 6/2015 | Wang ..................... H04L 5/0057 370/329 |
| 2016/0029401 A1 | 1/2016 | Fukuta et al. |
| 2016/0174282 A1 | 6/2016 | Grant et al. |
| 2016/0219475 A1 | 7/2016 | Kim |
| 2016/0242128 A1 | 8/2016 | Loehr et al. |

FOREIGN PATENT DOCUMENTS

| | | |
|---|---|---|
| KR | 10-2011-0068331 A | 6/2011 |
| KR | 10-2012-0072313 A | 7/2012 |
| KR | 10-2012-0082739 A | 7/2012 |
| KR | 10-2014-0095912 A | 8/2014 |
| KR | 10-2015-0005458 A | 1/2015 |
| KR | 10-2015-0018285 A | 2/2015 |
| KR | 10-2015-0020510 A | 2/2015 |

* cited by examiner

FIG. 1
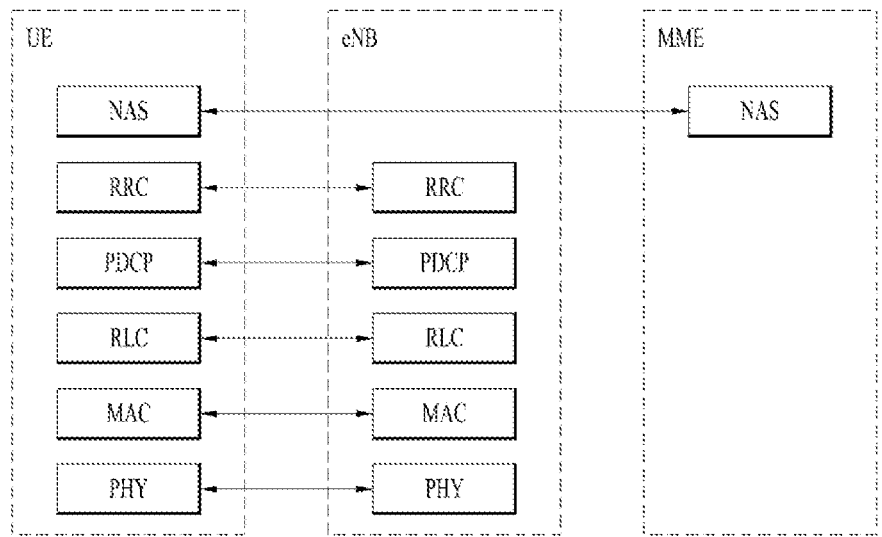
(a) Control-Plane Protocol Stack
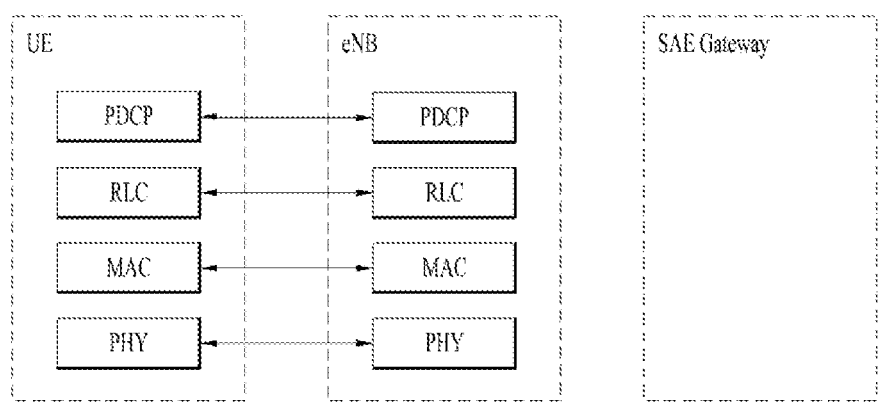
(b) User-Plane Protocol Stack

METHOD AND DEVICE FOR SEARCHING FOR ALTERNATIVE LINK IN WIRELESS COMMUNICATION SYSTEM

This application is a 35 USC § 371 National Stage entry of International Application No. PCT/KR2015/007812 filed on Jul. 27, 2015, and claims priority to U.S. Provisional Application No. 62/128,486 filed on Mar. 4, 2015, all of which are hereby incorporated by reference in their entireties as if fully set forth herein.

TECHNICAL FIELD

The present invention relates to a wireless communication system, and more particularly, to a method of searching for an alternative link in addition to a serving link and an apparatus therefor.

BACKGROUND ART

Recently, in order to implement a next generation mobile communication, e.g., 5G mobile communication, discussion on highly reliable communication is in progress. An MCS (mission critical service) corresponding to an example of the highly reliable communication requires error free transmission. An M2M communication field also requires the necessity of the highly reliable communication as a method of satisfying real-time for traffic safety, traffic efficiency, efficient industrial communication, and the like. The highly reliable communication can be utilized in various fields such as an application, a medical/emergency response, remote controlling, sensing, and the like sensitive to delay.

According to the MCSs discussed in 3GPP standardization meeting, it is able to expect that there may exist more improvement in End-to-End Latency, Ubiquity, Security, Availability/Reliability compared to legacy UMTS/LTE, and LTE-A/Wi-Fi. The currently proposed commercial radio technologies (e.g., 3GPP LTE, LTE-A) are unable to satisfy the requirements of the MCS in terms of the real time and the reliability. Meanwhile, an evaluation criterion for communication reliability can be defined according to various schemes. For example, the evaluation criterion can be defined by quality of wireless connection that satisfies a level of a specific service, by which the present invention may be non-limited.

In order to implement highly reliable communication for MCSs, it is required to have improvement in a method of sensing and controlling a radio link, a method of controlling dualization of a radio link connection, a method of promptly recovering a radio link connection, a method of managing a security key for safe wireless transmission, authentication, a method of protecting a personal privacy, and the like. To this end, discussion on a method of quickly searching for an available alternative link near a user equipment and managing the link in consideration of power consumption, a method of improving reliability/availability in providing a service via an optimized radio link connection, a method of minimizing service interruption time for a user equipment via quick recovery when a radio link is disconnected, a method of implementing safe communication by preventing intentional radio link damage, and the like is in progress.

DISCLOSURE OF THE INVENTION

Technical Task

A technical task of the present invention is to provide a method for a user equipment having a serving link to quickly searching for an alternative link and managing the alternative.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of searching for an alternative link by a user equipment in a wireless communication system, includes receiving service information including a target quality value of a service to be provided to the user equipment from a serving link base station, determining whether to search for a first alternative link based on a scheduling reference quality value to be used for scheduling the user equipment by the serving link base station at future timing and the target quality value, if it is determined to search for the first alternative link, searching for candidate base stations to configure the first alternative link, and establishing the first alternative link with a first candidate base station among the searched candidate base stations in a mode in which unicast data transmission/reception is deactivated.

Preferably, the scheduling reference quality value may correspond to a packet error rate (PER) which is determined according to a result of estimating a buffer status of the serving link base station at the future timing, or an amount of resource blocks (RBs) to be allocated to the user equipment.

Preferably, the method can further include receiving an indicator indicating the future timing at which the scheduling reference quality value is to be applied and the scheduling reference quality value.

Preferably, determining whether to search for the first alternative link can include determining to search for the first alternative link if the scheduling reference quality value exceeds the target quality value.

Preferably, the service information can include identifiers of a plurality of services including the service to be provided to the user equipment, a target quality value of each of the plurality of services, and a table to which a minimum quality value of each of the plurality of services is mapped.

Preferably, searching for the candidate base stations to configure the first alternative link can include comparing a log sum of a quality value obtained from the candidate base stations and the scheduling reference quality value with a log value of the target quality value, and reporting a list of candidate base stations of which the log sum is equal to or less than the log value of the target quality value and a result of the comparison to the serving link base station. In this case, the first candidate base station can be selected from the list of the candidate base stations.

Preferably, the method can further include releasing a connection with the serving base station if the scheduling reference quality value exceeds a minimum quality value of the service and activating the unicast data transmission/reception of the first alternative link.

Preferably, the method can further includes searching for candidate base stations to configure a second alternative link if a log sum of the scheduling reference quality value of the serving link base station and a quality value obtained from the first candidate base station exceeds the target quality value, and establishing the second alternative link with a second candidate base station among the searched candidate base stations to configure the second alternative link in a mode in which the unicast data transmission/reception is deactivated.

Preferably, the method can further include releasing the first alternative link from the first candidate base station if a quality value obtained from the first candidate base station exceeds a minimum quality value of the service.

To further achieve these and other advantages and in accordance with the purpose of the present invention, according to a different embodiment, a method of supporting a user equipment to search for an alternative link by a serving link base station in a wireless communication system, includes receiving an RRC connection request message from the user equipment, transmitting, to the user equipment, service information including a target quality value of a service to be provided to the user equipment if the RRC connection request message indicates that the user equipment supports predetermined services, determining a scheduling reference quality value to be used for scheduling the user equipment at future timing according to a result of estimating a buffer status at the future timing, and transmitting an indicator indicating the determined scheduling reference quality value and the future timing to the user equipment. In this case, the search of the alternative link of the user equipment can be triggered based on the target quality value and the scheduling reference quality value.

Preferably, the service information can include identifiers of the predetermined services, a target quality value of each of the predetermined services, and a table to which a minimum quality value of each of the predetermined services is mapped.

Preferably, the method can further include receiving a list of candidate base stations to configure the alternative link. In this case, a log sum of quality values provided by the candidate base stations and the scheduling reference quality value can be equal to or less than a log value of the target quality value. More preferably, the method can further include transmitting an alternative link configuration request to the candidate base stations to request the candidate base stations to establish a first alternative link with the user equipment, receiving an indicator indicating whether or not the first alternative link can be configured and an alternative link configuration response including service information of the candidate base stations from the candidate base stations, and transmitting the alternative link configuration response to the user equipment.

Preferably, the method can further include receiving an identifier of the user equipment and a message including an indicator indicating configuration of a first alternative link from a first candidate base station, which has established the first alternative link with the user equipment in the mode in which unicast data transmission/reception is deactivated.

To further achieve these and other advantages and in accordance with the purpose of the present invention, according to a further different embodiment, a user equipment searching for an alternative link in a wireless communication system includes a receiver configured to receive service information including a target quality value of a service to be provided to the user equipment from a serving link base station, and a processor configured to determine whether to search for a first alternative link based on a scheduling reference quality value to be used for scheduling the user equipment by the serving link base station at future timing and the target quality value, to search for candidate base stations to configure the first alternative link if it is determined to search for the first alternative link, and to establish the first alternative link with a first candidate base station among the searched candidate base stations in a mode in which unicast data transmission/reception is deactivated.

Advantageous Effects

According to one embodiment of the present invention, it is able to satisfy both a short delay requirement and a highly reliable requirement at the same time by securing and determining an optimized alternative link in advance by a user equipment before received signal quality is deteriorated.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 1 is a diagram illustrating structures of a control plane and a user plane of a radio interface protocol between a user equipment and E-UTRAN based on the 3GPP radio access network standard;

BEST MODE

Mode for Invention

Figure 2:
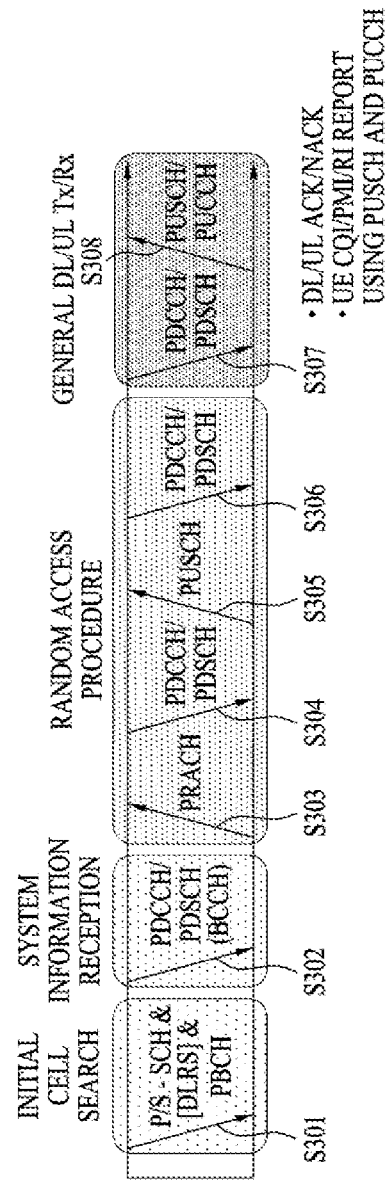
FIG. 2 is a diagram illustrating physical channels used in a 3GPP LTE system and a general method for transmitting a signal using the physical channels.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

FIG. 2 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 3:
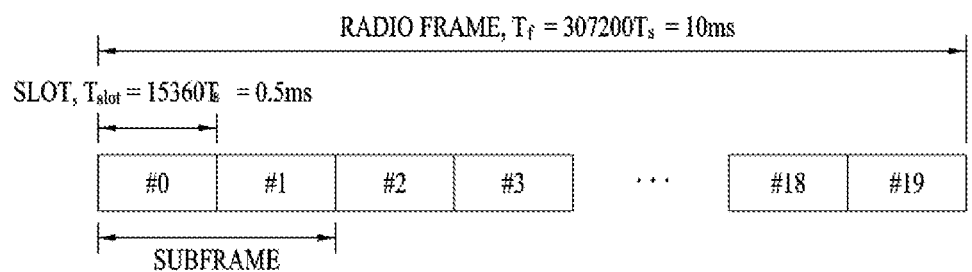
FIG. 3 is a diagram illustrating a structure of a radio frame used in an LTE system.

FIG. 3 is a diagram illustrating the structure of a radio frame used in an LTE system.

Referring to FIG. 3, the radio frame has a length of 10 ms ($327200 \times T_s$) and includes 10 equal-sized subframes. Each of the subframes has a length of 1 ms and includes two slots. Each slot has a length of 0.5 ms ($15360 T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 4:
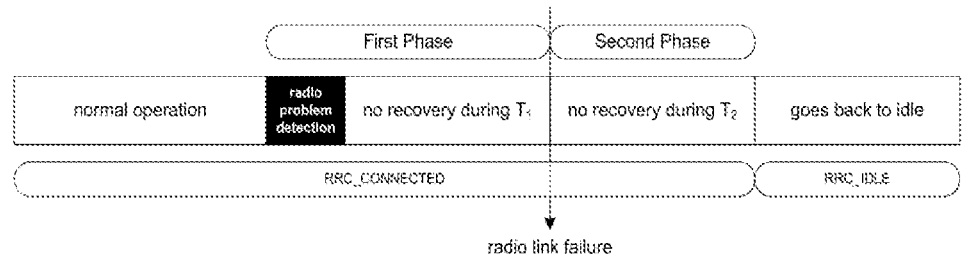
FIG. 4 is a diagram illustrating a radio link failure in LTE system.

FIG. 4 is a diagram illustrating a radio link failure in LTE system.

A radio link failure (RLF) may occur between a base station and a user equipment. The RLF corresponds to a state that it is difficult to transmit and receive a signal between a base station and a user equipment due to degradation of quality of a radio link between the base station and the user equipment. In the following, a procedure of detecting an RLF and a procedure of searching for a new radio link are explained.

In 3GPP LTE system, an RRC (radio resource control) state between a base station and a user equipment can be classified into RRC_CONENCTED state and RRC_IDLE state. The RRC_CONENCTED state corresponds to a state that an RRC connection is established between the base station and the user equipment. Hence, the user equipment can transceive data with the base station. The RRC_IDLE state corresponds to a state that an RRC connection is released between the base station and the user equipment.

An operation related to the RLF may include (1) detection of physical layer problems in the RRC_CONNECTED state, (2) recovery of physical layer problems, and (3) RLF detection.

(1) If a user equipment continuously receives "out-of-sync" indications from a lower layer as many as a predetermined value defined by N310, the user equipment drives a timer defined as T310. The "out-of-sync" indications can be provided to a higher layer when it is impossible to demodulate PDCCH received by a lower layer (physical layer) or when SINR (signal-to-interference plus noise ratio) is low. The N310 and the T310 correspond to higher layer parameters and can be given by a predefined value.

(2) If the user equipment receives continuous "in-sync" indications from the lower layer as many as a predetermined value defined by N311 while the T310 timer is driving, the user equipment stops the T310 timer. The N311 corresponds to a higher layer parameter and can be given by a predefined value. If the T310 timer is stopped, RRC connection is maintained without explicit signaling.

(3) On the contrary, if the T310 timer is expired, a random access problem indication is received from MAC layer, or an indication indicating the excess of the maximum retransmission number for an SRB (signaling radio bearer) or a DRB (data radio bearer) is received from RLC, the user equipment determines it as an RLF is detected. If the RLF is detected, the user equipment initiates a connection re-establishment procedure. If the T310 timer is expired, it indicates that the T310 timer arrives at determined time (T310) without stopping in the middle of driving the T310 timer. The connection re-establishment procedure corresponds to a procedure that the user equipment transmits an 'RRC connection re-establishment request' message to a base station, receives an 'RRC connection re-establishment' message from the base station, and transmits an 'RRC connection re-establishment completion' message to the base station. For details about the RLF-related operation, it may refer to the paragraph 5.3.11 of 3GPP standard document TS36.331.

As mentioned in the foregoing description, when a link status between a transmitter and a receiver is deteriorated, the RLF procedure may correspond to a procedure that a user equipment searches for a new link while operating an internal timer. In a system according to legacy 3GPP LTE standard, since it is difficult to anticipate a link (Uu link) between a base station and a user equipment, as mentioned in the foregoing description, it is able to determine whether or not an RLF is detected based on such a parameter as N310, N311, T310, or the like.

In particular, when an RLF is controlled based on a plurality of timers, although a user equipment recognizes a physical layer problem, the user equipment is able to determine an RLF only when a set timer (e.g., T310, T312) is expired. Subsequently, the user equipment performs an RRC connection re-establishment procedure. The user equipment starts a T311 timer while performing the RRC connection re-establishment procedure. If the user equipment fails to reestablish an RRC connection before the T311 timer is expired, the user equipment is switched to an RRC idle state.

Since the current LTE/LTE-A system is designed to conservatively process recovery from an RLF, it is difficult to search for an available link capable of being promptly replaced according to a channel state of a user equipment and it is difficult to secure an available alternative link for switching a connection to an alternative link. Hence, it is difficult for LTE system to satisfy reliability for MCSs. Since LTE/LTE-A system assumes a relatively good connectivity, if the LTE/LTE-A system experiences severe interference or a network resource is in an overload state, a considerably low transfer rate is provided.

However, as mentioned in the foregoing description, the next generation mobile communication should satisfy a rate of error occurrence equal to or less than $10^{-6}$ and reliability requirement equal to or less than $10^{-6}$. Hence, it is necessary to construct a highly reliable system capable of providing MCSs to a user equipment at all times while the user equipment does not recognize a disconnection of a radio link.

The present specification proposes a method of searching for an alternative link and maintaining the alternative link based on a quality value (e.g., PER: packet error rate) for user equipments receiving MCSs and/or a size of a resource (number of RBs). The embodiments of the present invention propose a method of satisfying high reliability (e.g., packet error rate $<10^{-9}$) and a delay requirement lower than 1 ms.

For example, a service of 5G mobile communication environment applicable to MCS may include remote controlling of a robot arm for industry automation, physical distribution delivery via remote controlling of AGVs (automated guided vehicles), remote medical service, drone remote control, information exchange between vehicles for providing autonomous driving service, transmission of a signal to indicate a hidden vehicle or a forward collision not detected by a sensor (e.g., camera, radar) of a vehicle, and the like, by which the present invention may be non-limited.

In order to seamlessly provide services, it is necessary for a user equipment to search for an alternative link and secure the link in advance for a case that connection quality of a serving link is deteriorated. If the quality of the serving link is degraded as much as quality not appropriate for MCSs, the user equipment should quickly switch to the alternative link. In particular, it is necessary for the user equipment to more quickly determine quality deterioration of the serving link, secure the alternative link before an RLF occurs, and switch to the alternative link.

In the following, when a user equipment searches for an alternative link and maintains the alternative link except a link used by the user equipment, it means that the user equipment has radio links satisfying minimum QoE for MCSs in a specific geographical region.

It may consider that radio link availability of LTE/LTE-A system definitely depends on a probability provided by network coverage. LTE/LTE-A system assumes that BER (block error rate) $10^{-1}$ is applied to unicast transmission transmitted via PDSCH and sufficient reliability is provided via HARQ retransmission without distinction between C-plane and U-plane. Yet, in order to provide MCSs through 5G mobile communication environment, it is necessary for a user equipment to secure an alternative link at all times while satisfying target reliability of MCSs by always maintaining the alternative link.

Meanwhile, according to the present invention, since it is difficult for a network to indicate an available alternative link one by one according to surrounding of a user equipment, the network indicates the user equipment to autonomously utilize radio links near the user equipment. For example, it may consider a method of avoiding disconnection of a radio link for providing MCS by making the user equipment search for available alternative links near the user equipment and secure the links. Yet, the user equipment is unable to know whether or not the secured serving link and the alternative links satisfy reliability required for the MCSs. Hence, it is necessary to have a method of searching for alternative links satisfying the reliability for the MCSs and maintaining the links.

In other word, when an alternative link is searched and maintained based on received signal quality, a user equipment performs a procedure for switching a link only after the user equipment recognizes the deterioration of the received signal quality. On the contrary, according to one embodiment of the present invention, a base station estimates a buffer status of the base station of certain timing in the future and provides a user equipment with a PER (packet error ratio) and an indicator for the timing based on scheduling corresponding to the estimated buffer status. By doing so, the user equipment can secure an alternative link in advance before the received signal quality is deteriorated.

In the following, an indicator indicating reliability for MCS is referred to as RLA (radio link availability). When QoE (quality of experience) of a user equipment is represented in the aspect of link quality, the RLA can be defined as equation 1.

$$RLA = Pr(RLQ \geq QoE) \quad \text{[Equation 1]}$$

In the equation 1, RLQ denotes measured radio link quality and QoE denotes a QoE requirement condition in terms of link quality.

The embodiments of the present invention can be classified as follows. A detail user equipment operation for each configuration shall be described in the following.

- A procedure of searching for an alternative link through PER (e.g., PER to be applied when scheduling is performed in consideration of a buffer status of a base station) of future timing estimated by a serving base station and an indicator for the timing.
- A procedure that a user equipment notifies a searched alternative link to a serving link base station and unicast data transmission/reception establishes RRC connection with the alternative link in an inactive mode.
- A procedure of searching for a different alternative link and securing the link according to the change of PER becoming a reference for scheduling of a searched alternative link base station.

Changing Scheduling Reference PER of Serving Link Base Station and Establishing Alternative Link A base station can perform scheduling on the basis of a predetermined quality value (e.g., PER). For example, when a base station serves a relatively small user equipment, since a buffer of the base station has room, PER is configured to be relatively low and the base station performs scheduling according to the PER. For example, when the base station selects a modulation and coding scheme, the base station may consider the PER. In the following, PER considered for scheduling is referred to as a scheduling reference PER.

Meanwhile a base station can estimate a scheduling reference PER at timing appearing after the current timing. For example, if a buffer is full or a space of the buffer is gradually reduced, the base station can estimate that the PER is configured to be higher than the current PER. The base station can provide a user equipment with the estimated PER value and information on future timing at which the estimated PER is to be applied.

The user equipment can initiate alternative link search via the future PER value and the information on the future timing received from the base station of the serving link.

In the following description, assume that all links are independent from each other and un-correlated. It may or may not perform signal combining on all links.

When a user equipment accesses a base station, the user equipment can inform the base station that the user equipment corresponds to a user equipment capable of providing MCS service (i.e., MCS capable user equipment). The base station can provide MCS capable user equipments with a target PER for each MCS and minimum PER information via RRC signaling or SI (system information). And, the base station determines PER of future timing to be applied to the MCS capable user equipments and can inform the user equipments of an indicator indicating the timing at which the determined PER is to be applied. The user equipment receives the PER to be applied in the future and the indicator indicating the timing at which the PER is applied and determines whether or not the future PER satisfies MCS target PER. If the future PER does not satisfy the MCS target PER, the user equipment searches for or updates an alternative link.

Figure 5:
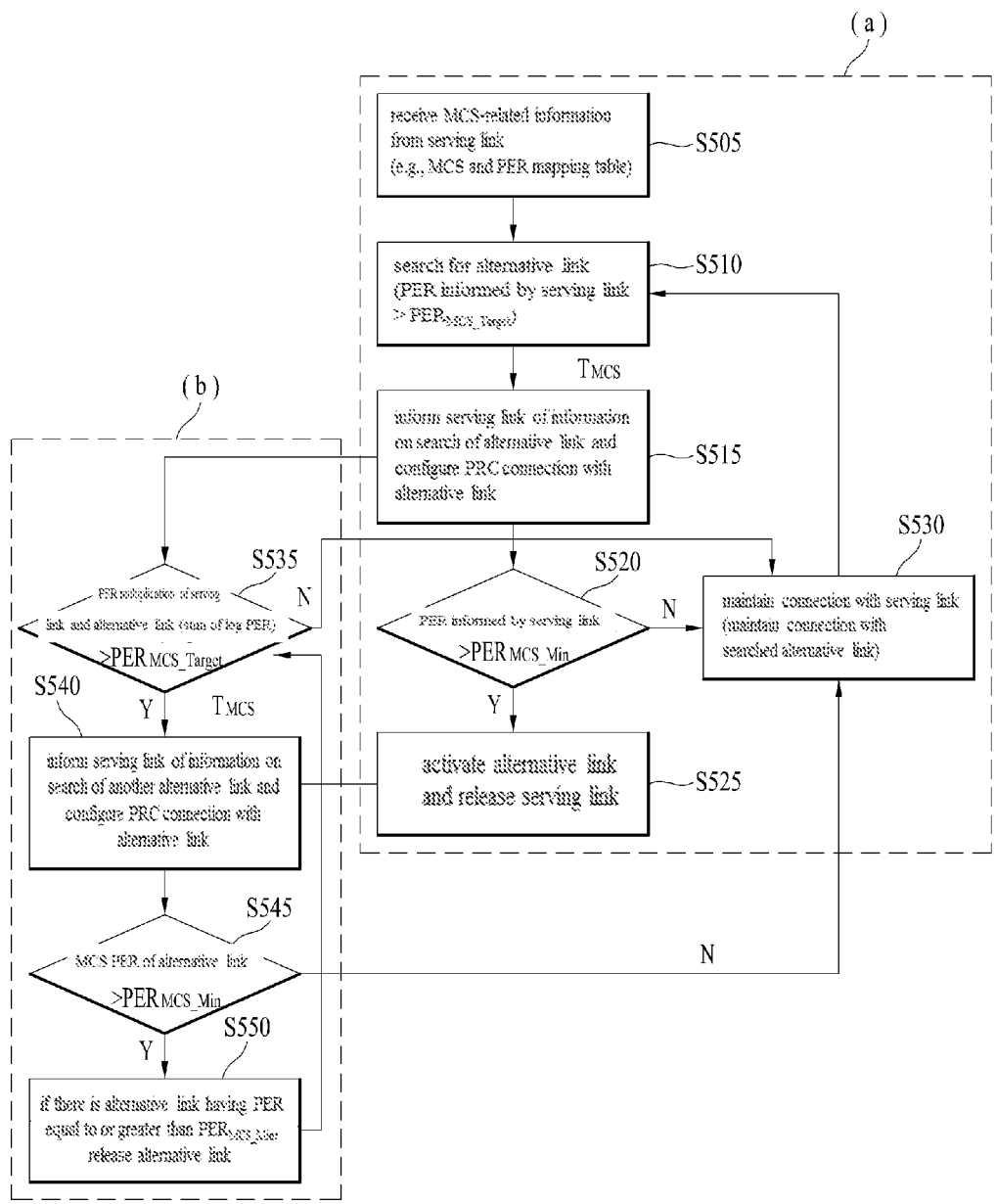
FIG. 5 is a flowchart for a method of searching for an alternative link and updating the alternative link according to one embodiment of the present invention.

FIG. 5 (a) is a flowchart for a method of searching for an alternative link according to one embodiment of the present invention.

According to the present embodiment, a user equipment receives a PER value to be changed and applied at future timing and information on the future timing at which the PER is applied from a serving link base station and the user equipment searches for an adjacent alternative link based on the PER value and the information.

Referring to FIG. 5, the user equipment receives service-related information necessary for receiving MCSs from the serving link base station [S505]. The service-related information can include PER requirement information for MCS. For example, the PER requirement information may correspond to identifiers of the MCSs, a target PER of each of the MCSs, and an MCS table to which a minimum PER of each of the MCSs is mapped.

The user equipment compares the target PER of MCS to be received by the user equipment with a PER to be applied by the serving link base station at the future timing [S510]. If the target PER of the MCS to be received by the user equipment is smaller than the PER of the future timing, the user equipment is able to know that the serving link base station is unable to satisfy the target PER of the MCS from the future timing. Hence, the user equipment starts to search for an alternative link.

The user equipment transmits a result of the alternative link search to the serving link base station and configures an RRC connection with a base station of the searched alternative link [S515]. The RRC connection configured with the base station of the alternative link can be configured in a state that unicast data transmission/reception is deactivated. For example, the user equipment configures a deactivated SRB with the base station of the alternative link. If the user equipment intends to activate the alternative link in the future, the user equipment can activate the SRB and configure a DRB (data radio bearer).

The user equipment compares the PER to be applied by the serving link base station at the future timing with a minimum PER of MCS to be received by the user equipment [S520].

If the PER to be applied by the serving link base station at the future timing is greater than the minimum PER of the MCS, the user equipment activates the RRC connection established with the alternative link base station and releases the RRC connection established with the serving link base station [S525]. For example, the user equipment can change the SRB configured with the alternative link base station in the deactivated state into an activated state. The user equipment activates the unicast transmission in the RRC connection of the alternative link. For example, the user equipment configures a DRB with the alternative link base station. According to one embodiment, the user equipment can directly request the alternative link base station to activate the RRC connection with the alternative base station. According to a different embodiment, the user equipment can activate the RRC connection with the alternative link base station via the serving link base station. For example, the user equipment informs the serving link base station that the serving link base station is unable to satisfy a target PER of MCS. By doing so, the serving link base station indicates the alternative link base station to activate the RRC connection.

As a specific example, assume that the user equipment maintains a link with the serving link base station and the serving link base station changes a scheduling reference PER. The serving link base station transmits the changes scheduling reference PER to the user equipment. If a target PER of MCS received from the serving link base station is less than the scheduling reference PER received from the serving link base station, the user equipment searches for an alternative link for satisfying the target PER of the MCS.

As a different specific example, assume that the user equipment maintains two alternative links with the serving link base station and the alternative link base station. If a combination of a scheduling reference PER (e.g., $10^{-5}$) of the serving link base station and a scheduling reference PER (e.g., $10^{-3}$) of the alternative link base station is greater than the target PER (e.g., $10^{-9}$) of the MCS, the user equipment searches for a different alternative link (e.g., $10^{-2}$) for satisfying the target PER of the MCS. The combination of the scheduling reference PER (e.g., $10^{-5}$) of the serving link base station and the scheduling reference PER (e.g., $10^{-3}$) of the alternative link base station may correspond to log PER sum, PER multiplication, or PER linear combination, by which the present invention may be non-limited.

Meanwhile, as a further different embodiment, the serving link base station can transmit information on a size of a resource (e.g., number of RBs) capable of being allocated to the user equipment to the user equipment to trigger alternative link search. The user equipment calculates PER between the user equipment and the serving link using a size of a resource capable of being allocated by the serving link base station and a size of data to be received by the user equipment.

Figure 6:
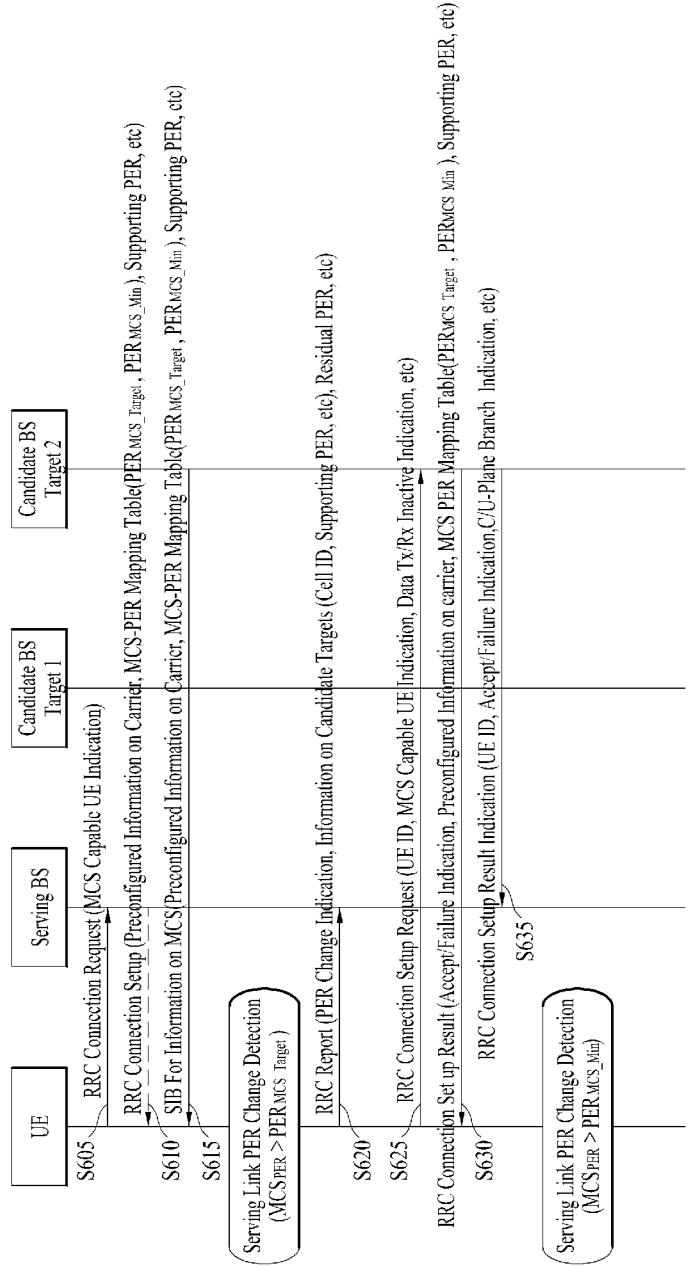
FIG. 6 is a flowchart for an alternative link search procedure of a user equipment according to a different embodiment of the present invention.

FIG. 6 is a flowchart for an alternative link search procedure of a user equipment according to a different embodiment of the present invention.

A user equipment transmits an RRC connection configuration message to a base station to request RRC connection configuration [S605]. The RRC connection configuration message includes an indicator indicating that the user equipment corresponds to an MCS capable user equipment.

The base station transmits an RRC connection configuration message to the user equipment [S610]. A serving link is established between the user equipment and the base station. For example, the RRC connection configuration message can include at least one selected from the group consisting of a dedicated carrier for MCSs, an MCS table (e.g., MCS target PER, MCS minimum PER), a scheduling reference PER to be applied at future timing, and information on the future timing at which the scheduling reference PER is applied. Meanwhile, according to one embodiment of the present invention, the information can also be transmitted via an SIB (system information block).

The RRC connection configuration message can further include PER capable of being provided to the user equipment by the base station at the current timing. If it is expected that the PER capable of being provided to the user equipment at the current timing is to be changed at future timing, the base station can transmit a scheduling reference PER to be changed and applied from the future timing and information on the future timing to the user equipment. According to one embodiment of the present invention, the changed scheduling reference PER and the information on the future timing can be transmitted to the user equipment via an RRC connection reconfiguration message.

Meanwhile, when a MCS and a general service rather than the MCS are provided to the user equipment (or the base station), in order to apply a different PER to the MCS and the general service, respectively, the user equipment (or the base station) can transmit an indicator indicating the start and the end of the MCS to the base station (or the user equipment). If the user equipment (or the base station) intends to receive the MCS, the user equipment (or the base station) transmits an indicator indicating the start of the MCS to the base station (or the user equipment) to inform the base station (or the user equipment) that it is necessary to apply PER for the MCS. If the user equipment (or the base station) intends to end the MCS, the user equipment (or the base station) transmits an indicator indicating the end of the MCS to the base station (or the user equipment) to inform the base station (or the user equipment) that it is not necessary to apply PER for the MCS.

If the serving link base station provides the user equipment with MCSs, the user equipment determines whether or not a scheduling reference PER to be applied by the serving link base station at future timing satisfies a target PER for MCS. If the scheduling reference PER is unable to satisfy the target PER for the MCS, the user equipment informs the serving link base station that the scheduling reference PER is unable to satisfy the target PER for the MCS and an alternative link is searched or updated by candidate base stations.

If a combination between PER of the serving link base station to be changed and minimum PER of a searched alternative link candidate base station is unable to satisfy a target PER of MCS, information (e.g., a log difference between the PER combination and the target PER) on PER insufficient for the target PER for the MCS can be transmitted to the serving link base station.

Meanwhile, candidate base stations broadcast (or unicast transmission via a dedicated RRC connection) PER for MCS capable of being provided by the candidate base stations via an SIB [S615]. Hence, the user equipment searching for an alternative link can determine whether to select a candidate base station as an alternative link. The PER forwarded via the SIB may correspond to a minimum value of the PER capable of being provided by the candidate base station for MCSs. The PER forwarded via a dedicated RRC connection may correspond to a PER value capable of being actually provided by a candidate base station according to a channel state. According to one embodiment, the PER information forwarded via the SIB or the dedicated RRC connection may correspond to PER guaranteed for at least N number of subframes as well as the minimum value of the PER or the actual PER value. For example, when two alternative link candidates provide the same PER, the user equipment may select a longer subframe in which PER is guaranteed as an alternative link.

If the combination between the PER of the serving link base station and the minimum PER of the searched candidate base station satisfies the target PER of MCS, the user equipment configures an RRC connection for an alternative link with the candidate base station. The user equipment transmits an RRC connection configuration request message, which includes an indicator indicating an RRC connection configuration mode of which unicast data transmission and reception is deactivated, to the candidate base station [S625]. The RRC connection configuration request message can further include information on the serving link base station.

The candidate base station transmits a result of the RRC connection configuration request to the user equipment [S630]. An alternative link is established between the user equipment and the candidate base station.

The alternative link base station, which has established the RRC connection with the user equipment, can identify the serving link base station via the information on the serving link base station transmitted by the user equipment. The alternative link base station transmits the result of the RRC connection configuration with the user equipment to the serving link base station [S635].

The alternative link base station can receive a request for activating the alternative link from the serving link base station according to a change of the scheduling reference PER of the serving link base station. The alternative link base station forwards an indicator indicating C/U-plane to the serving link base station and receives C/U-plane data from the serving link base station. The alternative link base station forwards the C/U-plane data to the user equipment via a DRB configured between the alternative link base station and the user equipment.

Figure 7:
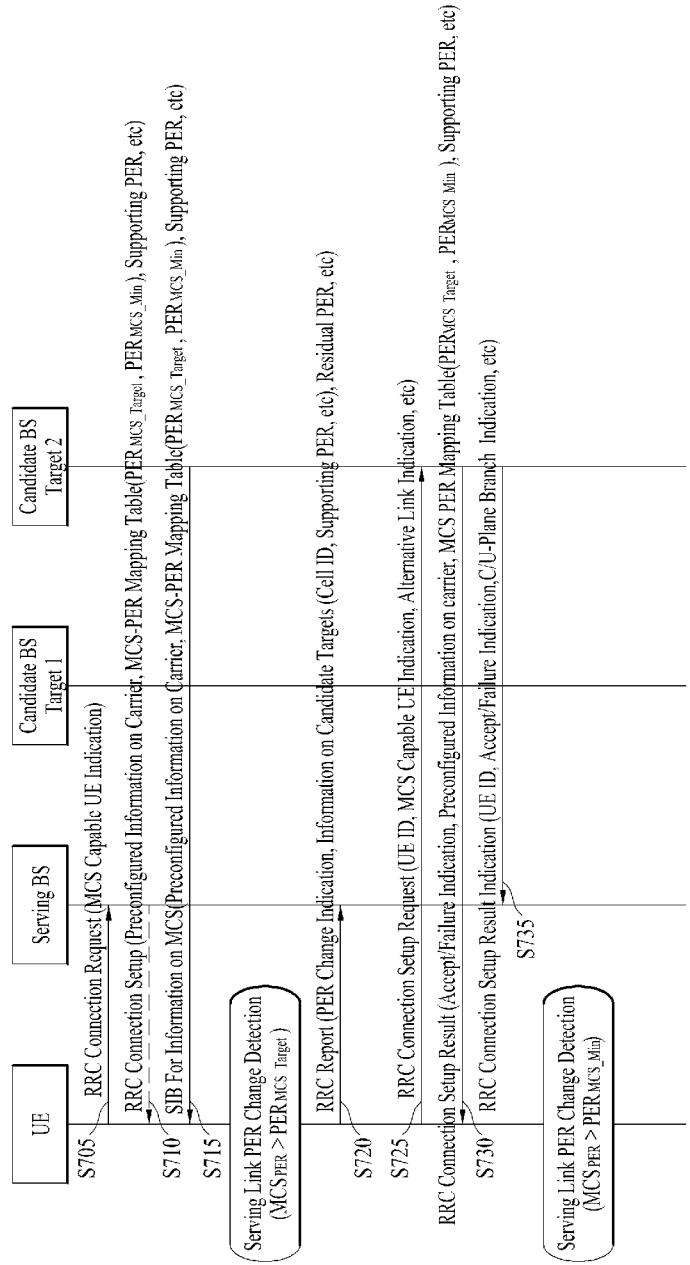
FIG. 7 is a flowchart for an alternative link search procedure of a user equipment according to a further different embodiment of the present invention.

FIG. 7 is a flowchart for an alternative link search procedure of a user equipment according to a further different embodiment of the present invention. Explanation on contents overlapped with the aforementioned contents is omitted. Candidate base stations can transmit a PER value via an SIB or periodically transmit the PER value similar to DRX mode.

A difference between the embodiment of FIG. 6 and the embodiment of FIG. 7 is described in the following. In case of the embodiment of FIG. 7, the user equipment transmits an RRC connection configuration request message including data transmission/reception activation indication (alternative link indication) to the alternative link base station [S725]. The alternative link base station can forward an RRC message received from the serving link base station to the user equipment via an SRB configured between the alternative link base station and the user equipment. Or, the alternative link base station can forward an RRC message generated by the alternative link base station to the user equipment via an SRB configured between the alternative link base station and the user equipment. Data received from the serving link base station is forwarded via a DRB configured between the alternative link base station and the user equipment.

Figure 8:
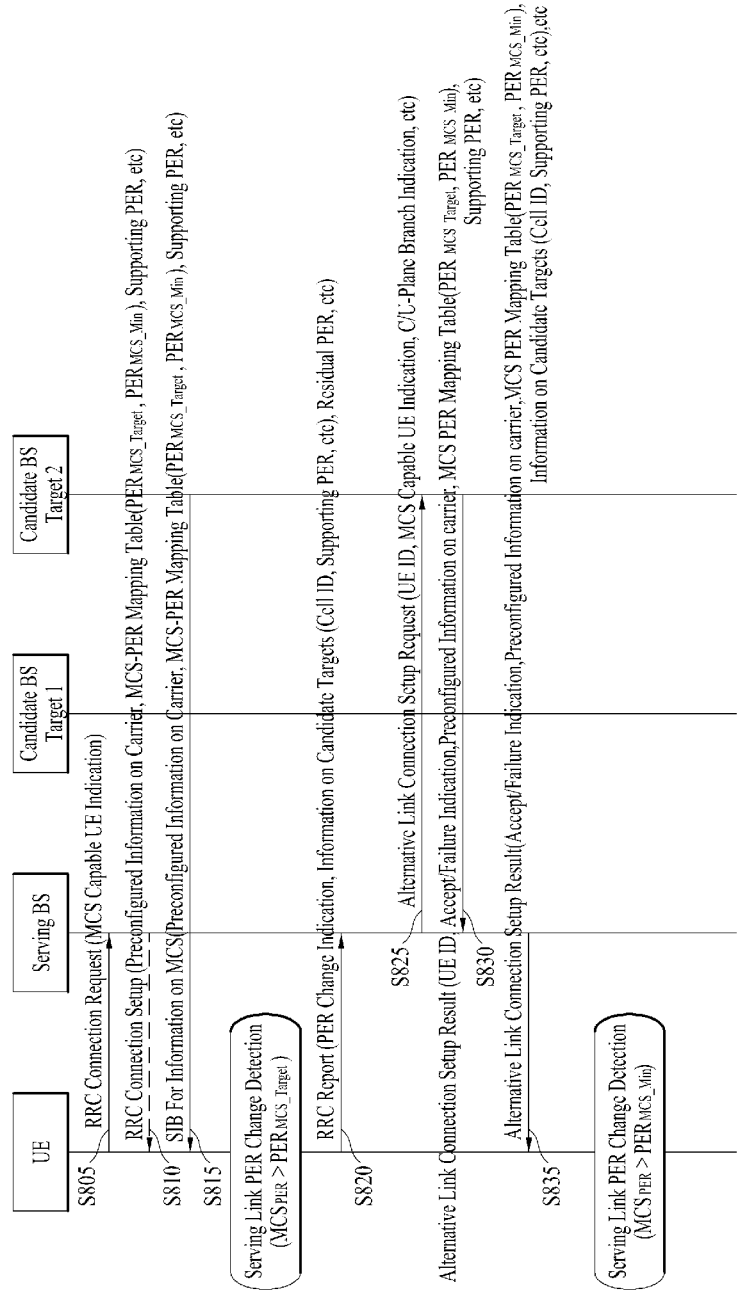
FIG. 8 is a flowchart for an alternative link search procedure of a user equipment according to a further different embodiment of the present invention.

FIG. 8 is a flowchart for an alternative link search procedure of a user equipment according to a further different embodiment of the present invention. Explanation on contents overlapped with the aforementioned contents is omitted.

A difference between the embodiment of FIG. 6 and the embodiment of

FIG. 8 is described in the following. In case of the embodiment of FIG. 6, an alternative link is secured in a manner that the user equipment requests an RRC connection configuration to the alternative link base station. On the contrary, in case of the embodiment of FIG. 8, the serving link base station secures an alternative link and then transmits a result of the secured alternative link to the user equipment.

The user equipment transmits an RRC connection request message to the serving link base station [S805] and the serving link base station transmits an RRC connection response message including a scheduling reference PER to be applied at future timing, an indicator indicating the future timing, and a MCS target PER to the user equipment [S810]. By doing so, the user equipment configures an RRC connection with the serving link base station.

If the user equipment recognizes that PER to be applied to the serving link base station does not satisfy the MCS target PER, the user equipment starts to search for alternative links near the user equipment. Since candidate base stations of an alternative link broadcast PER capable of being provided by the candidate base stations [S815], the user equipment can determine whether to select a candidate base station as an alternative link based on the PER provided by the candidate base stations.

The user equipment transmits a result of the alternative link selection to the serving link base station [S820].

If a combination of PER of the serving link base station and minimum PER of a searched candidate base station satisfies the MCS target PER, the user equipment transmits information of the candidate base station to the serving link base station. The serving link base station requests an alternative link configuration of the user equipment to the candidate base station [S825] and receives a result for the request from the candidate base station.

On the contrary, if the combination of the PER of the serving link base station and the minimum PER of the candidate base station does not satisfy the MCS target PER, the user equipment transmits information on PER insufficient for the MCS target PER to the serving link base station. The serving link base station transmits an alternative link connection request message to a candidate base station [S825]. The alternative connection request message can include UE context information. The candidate base station transmits an alternative link connection setup result message to the serving link base station. The alternative link connection setup result message can include an identifier of the candidate base station and an identifier (e.g., C-RNTI) to be used by the user equipment in the candidate base station. If it is necessary for the user equipment to match synchronization with the candidate base station, the alternative link connection setup result message can further include information on a user equipment-dedicated random access preamble allocated by the candidate base station. The user equipment matches timing synchronization with the candidate base station and transmits the random access preamble allocated by the candidate base station to the candidate base station. The user equipment receives a random access response message from the candidate base station in response to the random access preamble. The random access response message can include an identifier (e.g., C-RNTI) of the user equipment. Having accepted an alternative link, the candidate base station receives an indicator indicating C/U-plane from the serving link base station and receives C/U-plane data from the serving link base station via the indicator. The candidate base station can forward the C/U-plane data to the user equipment via a DRB.

Maintaining and Updating Searched Alternative Link

FIG. 5 (b) is a flowchart of a method for a user equipment to update an alternative link.

If a first alternative link base station informs the user equipment that scheduling reference PER to be applied at future timing is to be changed, the user equipment determines whether or not a combination of PER of the serving link base station and PER of the first alternative link base station is greater than a target MCS value [S535]. For example, the user equipment determines whether or not the multiplication of the PER of the serving link base station and the PER of the first alternative link base station (i.e., the sum of log PER values) is greater than a log PER value of the target MCS.

If the combination of the PER of the serving link base station and the PER of the first alternative link base station is greater than the target MCS value, the user equipment starts to search for a second alternative link base station to satisfy the target MCS. If the second alternative link is searched based on information on minimum PER of candidate base stations, the user equipment transmits a result for the second alternative link search to the serving link base station of the user equipment [S540]. The user equipment configures an RRC connection of which unicast data transmission/reception is deactivated with the second alternative base station. For example, the user equipment can configure a connection of an SRB deactivated state with the second alternative link base station.

The user equipment determines whether or not PER to be applied by the first alternative link base station at future timing is greater than the MCS minimum PER [S545]. If the PER to be applied by the first alternative link base station at the future timing is greater than the MCS minimum PER, the user equipment releases the RRC connection with the first alternative link base station [S550]. The user equipment maintains RRC connection of which unicast data transmission/reception is deactivated with the second alternative link base station only.

When the user equipment establishes the RRC connection with the second alternative link base station, the user equipment can transmit information on the serving link base station to the second alternative link base station. The second alternative link base station transmits a result for the RRC connection configuration with the user equipment to the serving link base station. The second alternative link base station can receive a request for activating an alternative link from the serving link base station according to a change of a scheduling reference PER of the serving link base station.

Figure 9:
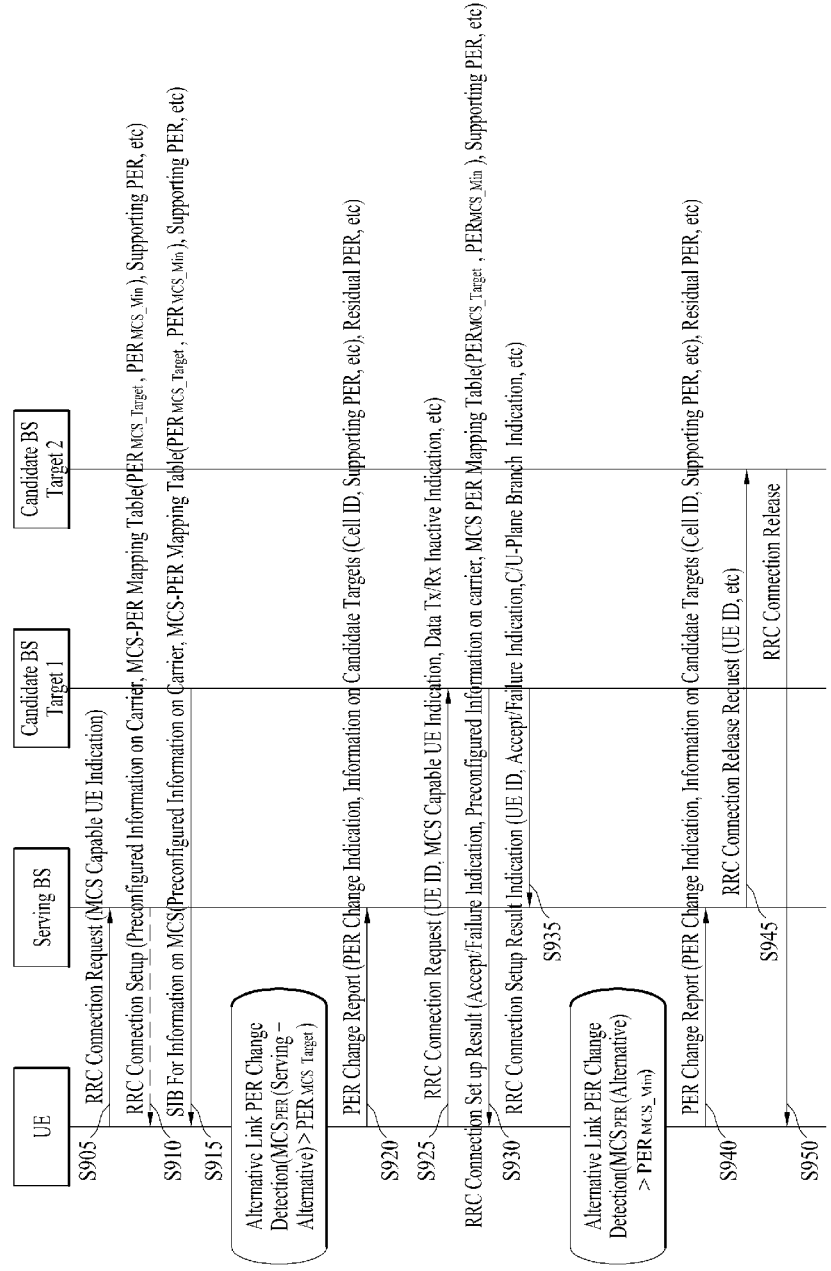
FIG. 9 is a flowchart for an alternative link search procedure of a user equipment according to a further different embodiment of the present invention.

FIG. 9 is a flowchart for an alternative link search procedure of a user equipment according to a further different embodiment of the present invention. Referring to the embodiment of FIG. 9, if the user equipment recognizes that scheduling reference PER of the first alternative link base station is to be changed, the user equipment searches for a second alternative link. Explanation on contents overlapped with the aforementioned contents is omitted.

The user equipment transmits an RRC connection request including an indicator indicating a MCS capable user equipment to the serving link base station [S905].

The serving link base station transmits an RRC connection configuration message (or SIB) to the user equipment [S910]. The RRC connection configuration message can include a dedicated carrier for MCSs, a MCS table, a scheduling reference PER to be applied at future timing, and information on the future timing at which the scheduling reference is applied. If the abovementioned information is changed, the base station can transmit the changed information to the user equipment via an RRC connection reconfiguration message.

Meanwhile, the user equipment (or the serving link base station) can transmit an indicator indicating the start and the end of MCS to the serving link base station (or the user equipment).

When the user equipment receives MCSs from the serving link base station, if the user equipment recognizes that PER to be changed and applied by the serving link base station does not satisfy MCS target PER, the user equipment reports the PER to the serving link base station and searches for a first alternative link and update the first alternative link via candidate base stations [S920]. For example, the user equipment can report a difference between the sum of the PER to be changed and applied by the serving link base station and the minimum PER of the first alternative link base station and the MCS target PER to the serving link base station.

The user equipment can determine whether to select the first alternative link based on a lower limit value of PER broadcasted by candidate base stations. If the sum of the PER to be changed and applied by the serving link base station and PER of a candidate base station satisfies the target PER of MCS, the user equipment configures an RRC connection for the first alternative link with the candidate base station(s) [S925]. In this case, RRC connection configuration mode can transmit an indicator indicating that unicast transmission/reception is in an inactive mode. The user equipment can transmit information on the serving link base station to a candidate base station configuring the first alternative link.

If the sum of the PER of the serving link base station and PER of the first alternative link base stations is greater than the MCS target PER, the user equipment searches for a second alternative base station. If the second alternative link is searched, the user equipment reports the second alternative link to the serving link base station [S940]. The user equipment configures an RRC connection with the base station of the second alternative link. If quality of the first alternative link is deteriorated more than the MCS minimum PER, the user equipment releases the RRC connection with the first alternative link base station. The user equipment maintains the RRC connection with the second alternative base station.

Figure 10:
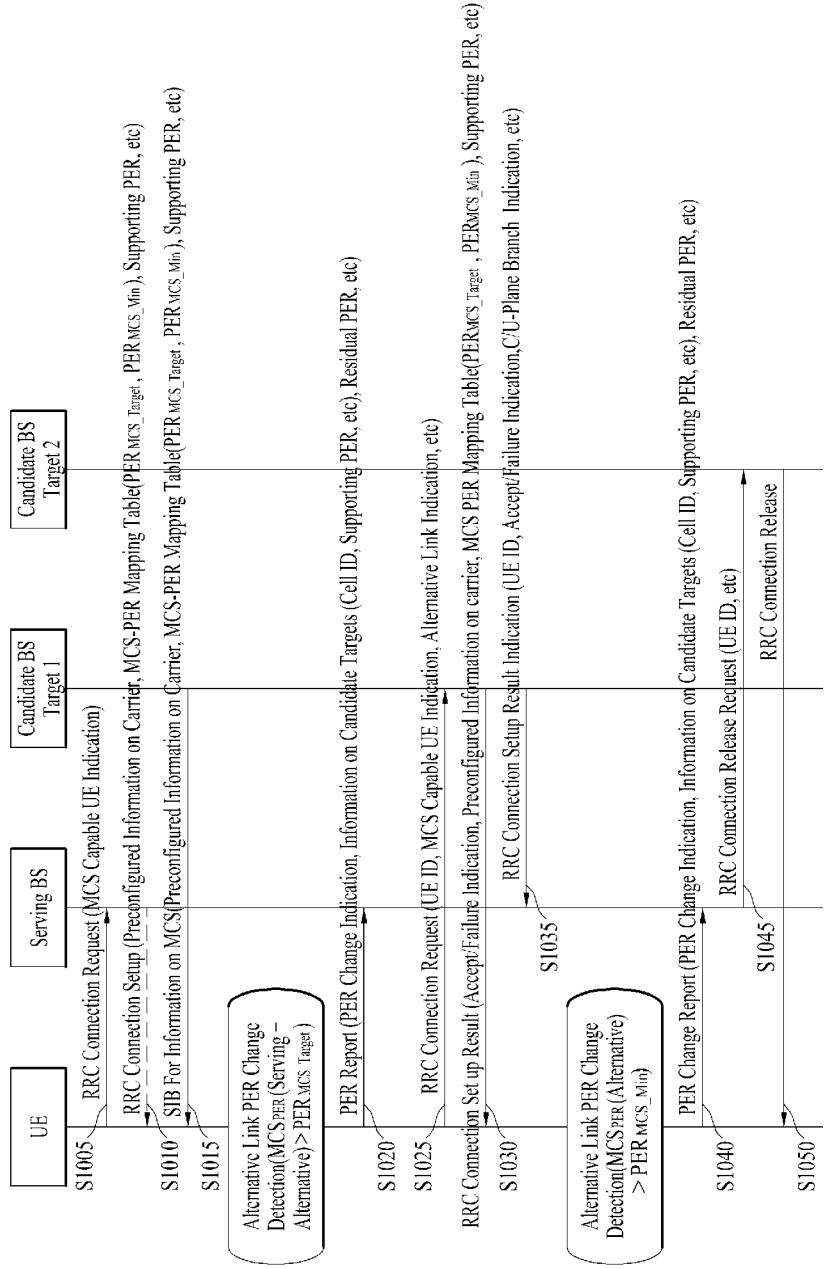
FIG. 10 is a flowchart for an alternative link search procedure of a user equipment according to a further different embodiment of the present invention.

FIG. 10 is a flowchart for an alternative link search procedure of a user equipment according to a further different embodiment of the present invention. Explanation on contents overlapped with the aforementioned contents is omitted.

A difference between the embodiment of FIG. 9 and the embodiment of FIG. 10 is explained in the following. Referring to the embodiment of FIG. 10, the user equipment configures an RRC connection with an alternative link base station in a data transmission/reception activation mode. The alternative link base station forwards an RRC message received from the serving link base station to the user equipment via an SRB configured between the alternative link base station and the user equipment. Or, an RRC message generated by the alternative link base station can be forwarded to the user equipment via the SRB. Data received from the serving link base station is forwarded to the user equipment via a DRB configured between the alternative link base station and the user equipment.

Figure 11:
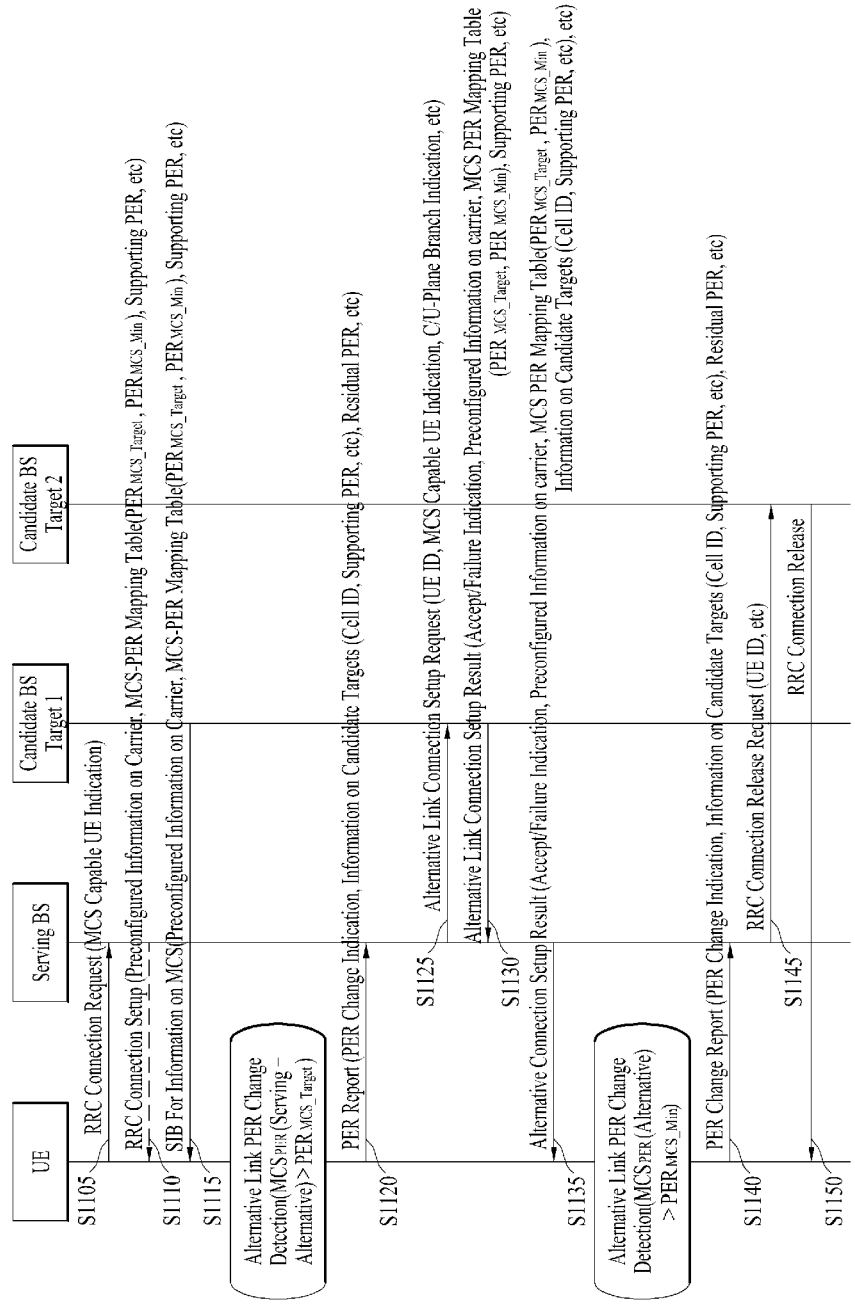
FIG. 11 is a flowchart for an alternative link search procedure of a user equipment according to a further different embodiment of the present invention.

FIG. 11 is a flowchart for an alternative link search procedure of a user equipment according to a further different embodiment of the present invention. Explanation on contents overlapped with the aforementioned contents is omitted. There is a difference between the embodiment of FIG. 11 and the aforementioned embodiments in that the serving link base station informs the user equipment of a result of securing an alternative link.

A first alternative link base station determines PER to be applied at future timing according to a buffer status and broadcasts an indicator indicating the future timing [S1115].

If the user equipment recognizes that the sum of PER of the first alternative link base station and PER of the serving link base station does not satisfy MCS target PER, the user equipment starts to search for a second alternative link. The user equipment reports a search result of the second alternative link to the serving link base station [S1120]. For example, if the sum of the PER of the first alternative link base station, the PER of the serving base station, and PER of a candidate base station of the second alternative link satisfies the MCS target PER, the user equipment reports the search of the second alternative link to the serving link base station. For example, information reported to the serving link base station by the user equipment corresponds to information on candidate base stations of the second alternative link.

If the sum of the PER of the first alternative link base station, the PER of the serving base station, and the PER of the candidate base station of the second alternative link does not satisfy the MCS target PER, the user equipment can report information on PER insufficient for the MCS target PER to the serving link base station.

The serving link base station transmits an alternative link configuration request to the candidate base station(s) of the second alternative link [S1125]. The alternative link configuration request can include UE context.

The serving link base station receives a response including a result for the second alternative link configuration request from the candidate base station(s) of the second alternative link [S1130]. The response of the second alternative link candidate base stations can include an identifier of a candidate base station, an identifier (e.g., C-RNTI) to be used by the user equipment in the candidate base station, and, if synchronization is necessary with the candidate base station, information on a random access preamble.

The user equipment receives the response of the candidate base stations via the serving link base station [S1135]. If synchronization is necessary, the user equipment matches synchronization with the candidate base stations and transmits a random access preamble allocated by a candidate base station to the candidate base stations. The user equipment receives a random access response message including an identifier (e.g., C-RNTI) of the user equipment from the candidate base stations. The candidate base stations receive an indication indicating C/U-plane from the serving link base station. The candidate base stations receive C/U-plane data from the serving link base station and forward the data to the user equipment via a DRB.

Configuring Multiple Connections When user Equipment Performs Initial Access

When a user equipment performs an initial access, procedures for the user equipment to configure a connection with a plurality of base stations are explained irrespective of the search of an alternative link searched by the user equipment based on the aforementioned PER. When it is not necessary to match synchronization between a user equipment and base stations (e.g., small cell environment (TA between a user equipment and a base station is close to 0)), following embodiments can be applied to environment in which a new waveform-based asynchronous system is constructed.

In the following embodiments, a base station to which a user equipment attempts to initially access is referred to as a temporary serving base station. The temporary serving base station plays a role of a serving base station in an initial access procedure of the user equipment. Yet, it is not mandatory that the temporary serving base station plays a role of the serving base station of the user equipment after the initial access procedure is completed. After the initial access procedure is completed, the serving base station may become a temporary serving base station or a different base station depending on wireless communication environment. For example, referring to embodiments shown in FIGS. 12 and 14, a temporary serving base station becomes a serving base station of a user equipment as it is. On the contrary, referring to embodiments shown in FIGS. 13 and 15, a different base station rather than a temporary serving base station becomes a serving base station of a user equipment.

Figure 12:
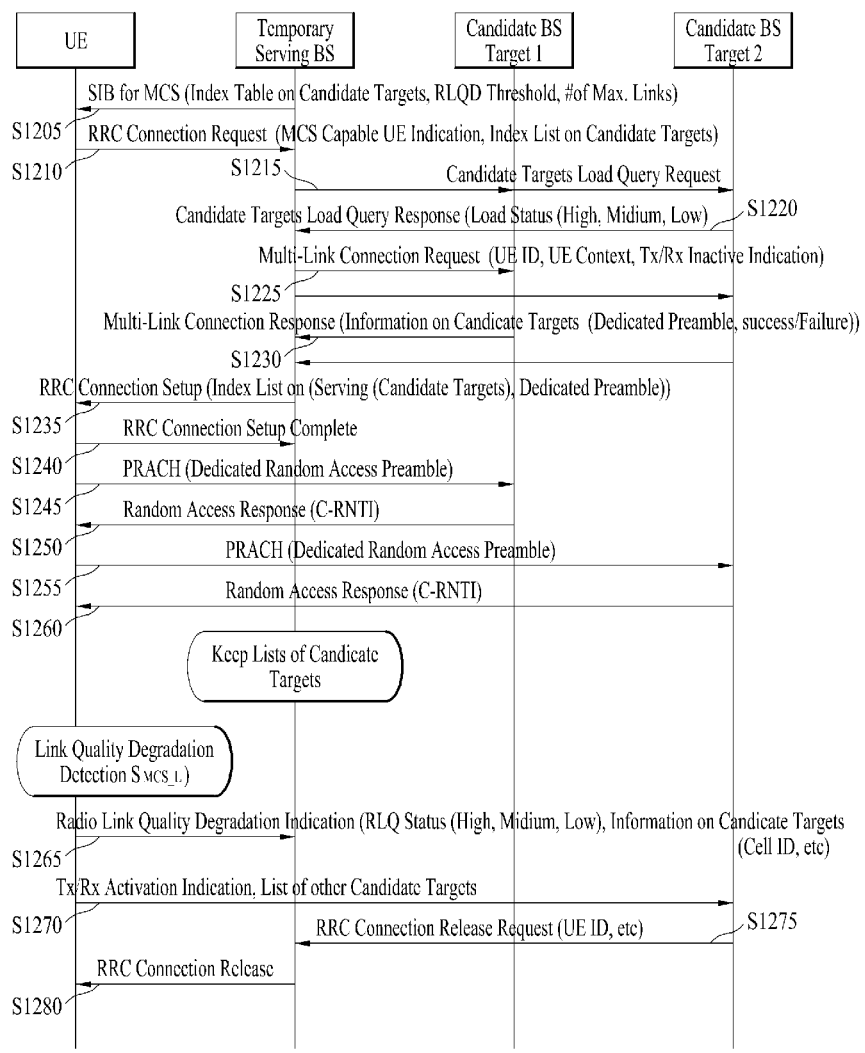
FIG. 12 is a flowchart for an initial access procedure of a user equipment according to one embodiment of the present invention.

FIG. 12 is a flowchart for an initial access procedure of a user equipment according to one embodiment of the present invention.

A user equipment receives system information for MCS from a temporary serving base station [S1205]. The system information may correspond to an SIB (system information block). The system information for MCS can include at least one selected from the group consisting of an index table for candidate base stations, an RLQD (radio link quality degradation) threshold, and information on the maximum number of links.

The index table for candidate base stations may correspond to an index list of neighboring candidate base stations identified and occupied by the temporary serving base station (e.g., index 1—cell 1, index 2—cell 2, . . . , index n—cell n).

The RLQD threshold corresponds to threshold value information for multi-link access. For example, the RLQD threshold can include information such as a minimum reception signal quality threshold value for finally selecting a serving base station at initial access, a reception signal quality threshold value for searching for an alternative link, a reception signal quality threshold value for releasing a serving link (or alternative link), and the like.

The information on the maximum number of links corresponds to the maximum number of serving links/alternative links capable of being connected at the same time by the user equipment.

The user equipment transmits an RRC connection request message to the temporary serving base station [S1210]. The RRC connection request message can include index list information on the candidate base stations identified by the user equipment according to the minimum reception signal quality threshold value received from the temporary serving base station.

The temporary serving base station transmits a load query request to each of the candidate base stations [S1215].

The temporary serving base station receives a load query response from each of the candidate base stations [S1220]. The load query response can represent a load status of each of the candidate base stations as high, medium, and low for example. The temporary serving base station can determine a candidate base station appropriate for providing MCS to the user equipment in consideration of a load status.

The serving base station transmits a multi-link connection request to a candidate base station in consideration of a load status of each of the candidate base stations [S1225]. For example, the serving base station transmits the multi-link connection request to a candidate base station appropriate for providing MCS to the user equipment. The multi-link connection request can include an identifier of the user equipment (e.g., IMSI, GUTI), a user context (e.g., RRC context, UE context), Tx/Rx inactive indicator, and a serving/candidate indicator. The Tx/Rx inactive indicator indicates whether or not a connection between candidate base stations and the user equipment is configured by a transmission/reception inactive mode. When a temporary base station temporarily accessed by the user equipment is not an actual serving base station of the user equipment, the serving/candidate indicator indicates a candidate base station corresponding to a serving base station of the user equipment and a candidate base station corresponding to a base station of an alternative link.

In the embodiment of FIG. 12, assume that the temporary serving base station corresponds to an actual serving base station of the user equipment. Hence, the temporary serving base station is referred to as a serving base station. Moreover, assume that all candidate base stations have accepted the multi-link connection request. In particular, the candidate base stations become alternative link base stations of the user equipment.

The serving base station receives a multi-link connection response from the candidate base stations [S1230]. The multi-link connection response includes information on the candidate base stations. The multi-link connection response includes C-RNTI and an indicator indicating whether or not the multi-link request is successful. If it is necessary for the user equipment to match synchronization with a candidate base station, the multi-link connection response can further include a user equipment-dedicated preamble.

The serving base station transmits an RRC connection configuration message to the user equipment [1235]. The RRC connection configuration message can include an index list of the serving or candidate base stations and a list of C-RNTIs received from the candidate base stations. The RRC connection configuration message can also include a serving/candidate base station indicator. When the temporary serving base station is not an actual serving base station of the user equipment, the serving/candidate base station indicator indicates a serving base station and a candidate base station. The RRC connection configuration message can further include a list of base stations and a list of user equipment-dedicated preambles. The list of base stations may correspond to index information of serving base stations or candidate base stations. The list of user equipment-dedicated preambles may correspond to a list of user equipment-dedicated preambles received from candidate base stations.

The user equipment transmits an RRC connection configuration completion message to the serving base station [S1240]. After an RRC connection between the serving base station and the user equipment is configured, the serving base station maintains a list of alternative link base stations.

If synchronization between base stations is not matched, it is necessary for the user equipment to perform synchronization with candidate base stations to configure an alternative link. Hence, the user equipment transmits a random access preamble to candidate base stations with which an alternative link is configured [S1245/S1255]. The user equipment transmits a user equipment-dedicated random access preamble allocated by a first candidate base station to the first candidate base station. The user equipment transmits a user equipment-dedicated random access preamble allocated by a second candidate base station to the second candidate base station. The user equipment receives a random access response message from each of the candidate base stations [S1250/S1260]. The random access response message includes C-RNTI allocated to the user equipment by each of the candidate base stations. If synchronization between base stations is matched, the steps S1245 to S1260 can be omitted.

If radio link quality degradation is detected, the user equipment transmits an RLQD indication message to the serving base station [S1265]. For example, if quality of the serving base station is equal to or less than the $S_{MCS\_L}$, the user equipment transmits the RLQD indication message to the serving base station. The RLQD message can include an RLQ status (e.g., high, medium, low) and information on candidate base stations (e.g., cell ID).

The user equipment transmits a Tx/Rx activation indication and a list of other candidate base stations to a predetermined candidate base station [S1270].

The predetermined candidate base station transmits an RRC connection release request to the serving base station [S1275]. The RRC connection release request can include an identifier of the user equipment.

The serving base station releases an RRC connection with the user equipment [S1280].

Figure 13:
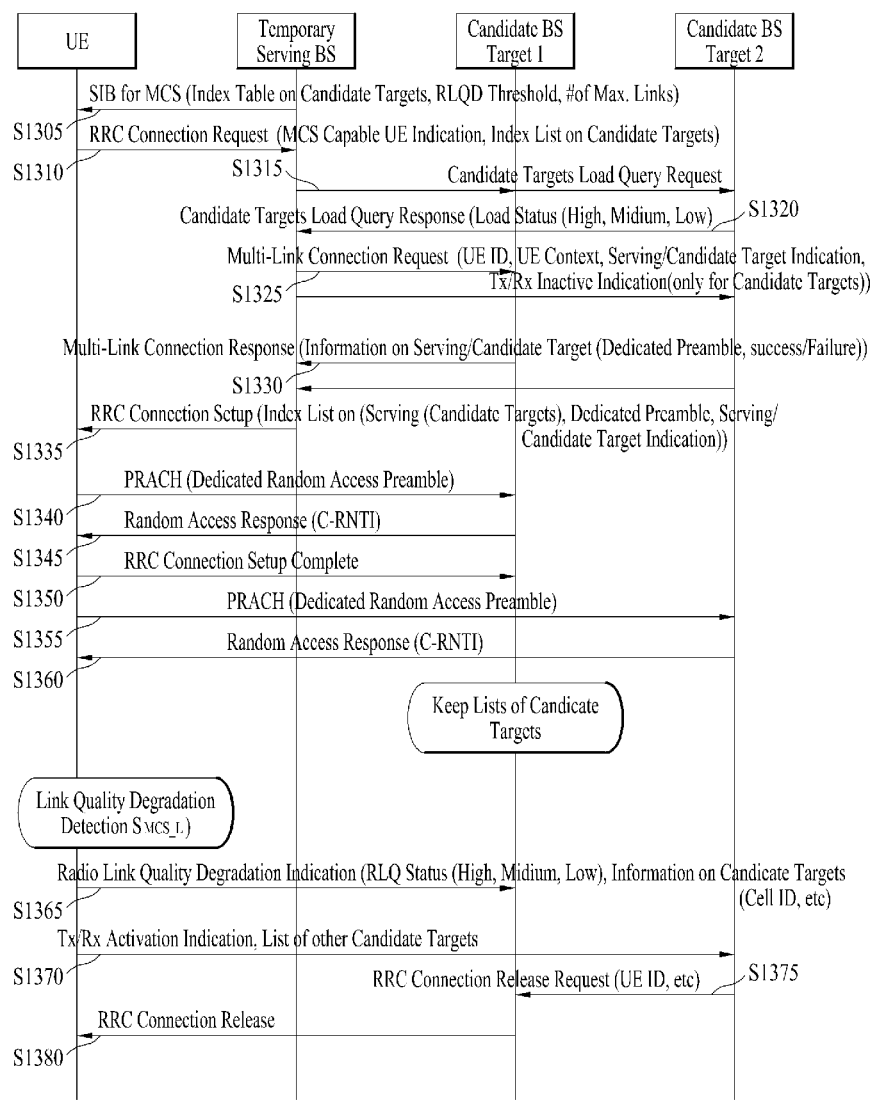
FIG. 13 is a flowchart for an initial access procedure of a user equipment according to a different embodiment of the present invention.

FIG. 13 is a flowchart for an initial access procedure of a user equipment according to one embodiment of the present invention. Explanation on contents overlapped with the aforementioned contents is omitted.

A user equipment receives system information for MCS from a temporary serving base station [S1305]. The user equipment transmits an RRC connection request message to the temporary serving base station [S1310]. The temporary serving base station transmits a load query request to each of candidate base stations [S1315]. The temporary serving base station receives a load query response from each of the candidate base stations [S1320]. The temporary serving base station transmits a multi-link connection request to the candidate base stations in consideration of a load status of each of the candidate base stations [S1325]. The temporary serving base station receives a multi-link connection response from the candidate base stations [S1330].

In the embodiment of FIG. 13, assume that a first candidate base station rather than the temporary serving base station becomes a serving base station of the user equipment. Moreover, assume that all candidate base stations have accepted the multi-link connection request. In particular, the candidate base stations become alternative link base stations of the user equipment.

The temporary serving base station transmits an RRC connection configuration message to the user equipment [S1335]. The RRC connection configuration message can indicate that the first candidate base station corresponds to the serving base station of the user equipment.

If synchronization between base stations is not matched, it is necessary for the user equipment to perform synchronization with candidate base stations to configure an alternative link or a serving link. Hence, the user equipment transmits a user equipment-dedicated random access preamble to candidate base stations with which an alternative link or a serving link is configured [S1340/S1355]. The user equipment receives a random access response message from each of the candidate base stations [S1345/S1360]. If synchronization between base stations is matched, the synchronization procedure can be omitted.

The user equipment transmits an RRC connection configuration completion message to the first candidate base station rather than the temporary serving base station [S1350]. An RRC connection is configured between the first candidate base station and the user equipment. The first candidate base station is referred to as the serving base station.

If radio link quality degradation is detected, the user equipment transmits an RLQD indication message to the serving base station [S1365]. The user equipment transmits a Tx/Rx activation indication and a list of other candidate base stations to a predetermined candidate base station [S1370]. The predetermined candidate base station transmits an RRC connection release request to the serving base station [S1375]. The serving base station releases an RRC connection with the user equipment [S1380].

In the embodiments of FIGS. 12 and 13, the user equipment transmits the RLQD indication message to the serving base station and the user equipment transmits the Tx/Rx activation indication to the alternative link base station. Yet, according to a different embodiment of the present invention, the Tx/Rx activation indication is transmitted to the alternative link base station by the serving base station rather than the user equipment.

Figure 14:
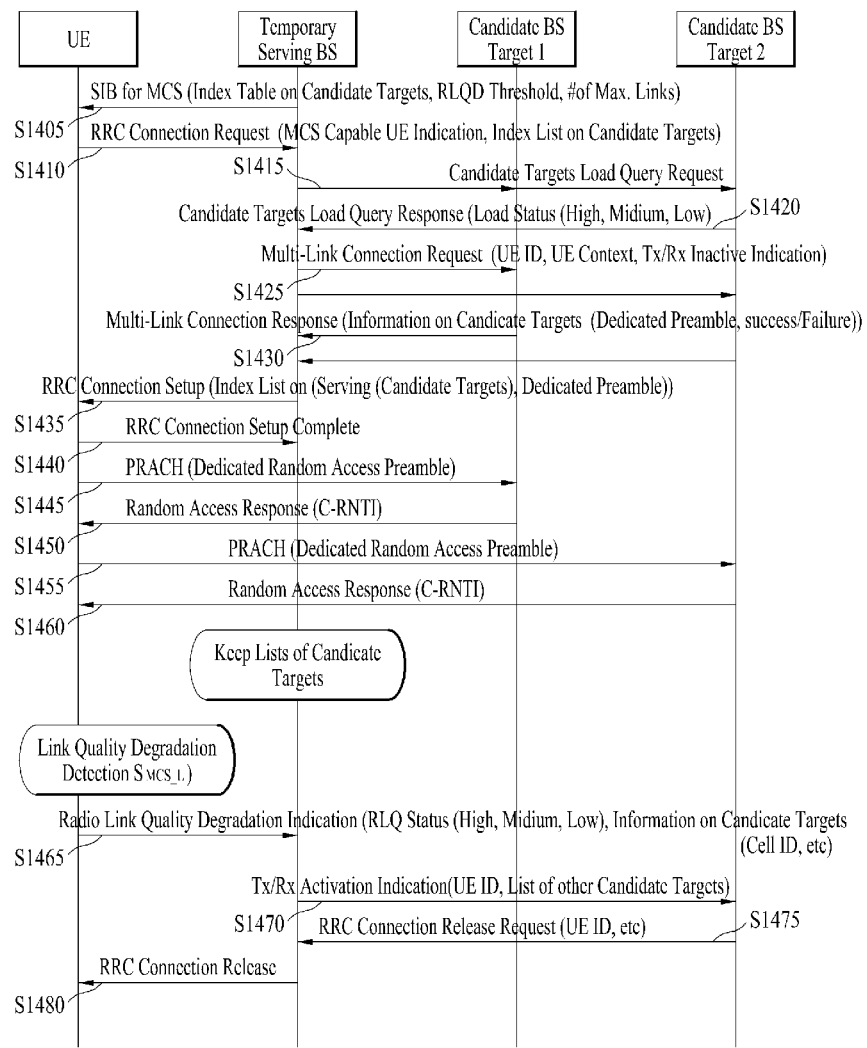
FIG. 14 is a flowchart for an initial access procedure of a user equipment according to a further different embodiment of the present invention.

FIG. 14 is a flowchart for an initial access procedure of a user equipment according to one embodiment of the present invention. Explanation on contents overlapped with the aforementioned contents is omitted.

A user equipment receives system information for MCS from a temporary serving base station [S1405]. The user equipment transmits an RRC connection request message to the temporary serving base station [S1410]. The temporary serving base station transmits a load query request to each of candidate base stations [S1415]. The temporary serving base station receives a load query response from each of the candidate base stations [S1420]. The temporary serving base station transmits a multi-link connection request to the candidate base stations in consideration of a load status of each of the candidate base stations [S1425]. The temporary serving base station receives a multi-link connection response from the candidate base stations [S1430].

In the embodiment of FIG. 14, assume that the temporary serving base station becomes a serving base station of the user equipment. Moreover, assume that all candidate base stations have accepted the multi-link connection request. In particular, the candidate base stations become alternative link base stations of the user equipment.

The temporary serving base station transmits an RRC connection configuration message to the user equipment [S1435]. The user equipment transmits an RRC connection configuration completion message to the serving base station [S1440].

If synchronization between base stations is not matched, it is necessary for the user equipment to perform synchronization with candidate base stations to configure an alternative link. Hence, the user equipment transmits a user equipment-dedicated random access preamble to candidate base stations with which an alternative link is configured [S1445/S1455]. The user equipment receives a random access response message from each of the candidate base stations [S1450/S1460]. If synchronization between base stations is matched, the steps S1445 to S1460 can be omitted.

If radio link quality degradation is detected, the user equipment transmits an RLQD indication message to the serving base station [S1465].

The serving base station transmits a Tx/Rx activation indication and a list of other candidate base stations to a predetermined candidate base station [S1470]. The predetermined candidate base station transmits an RRC connection release request to the serving base station [S1475]. The serving base station releases an RRC connection with the user equipment [S1480].

Figure 15:
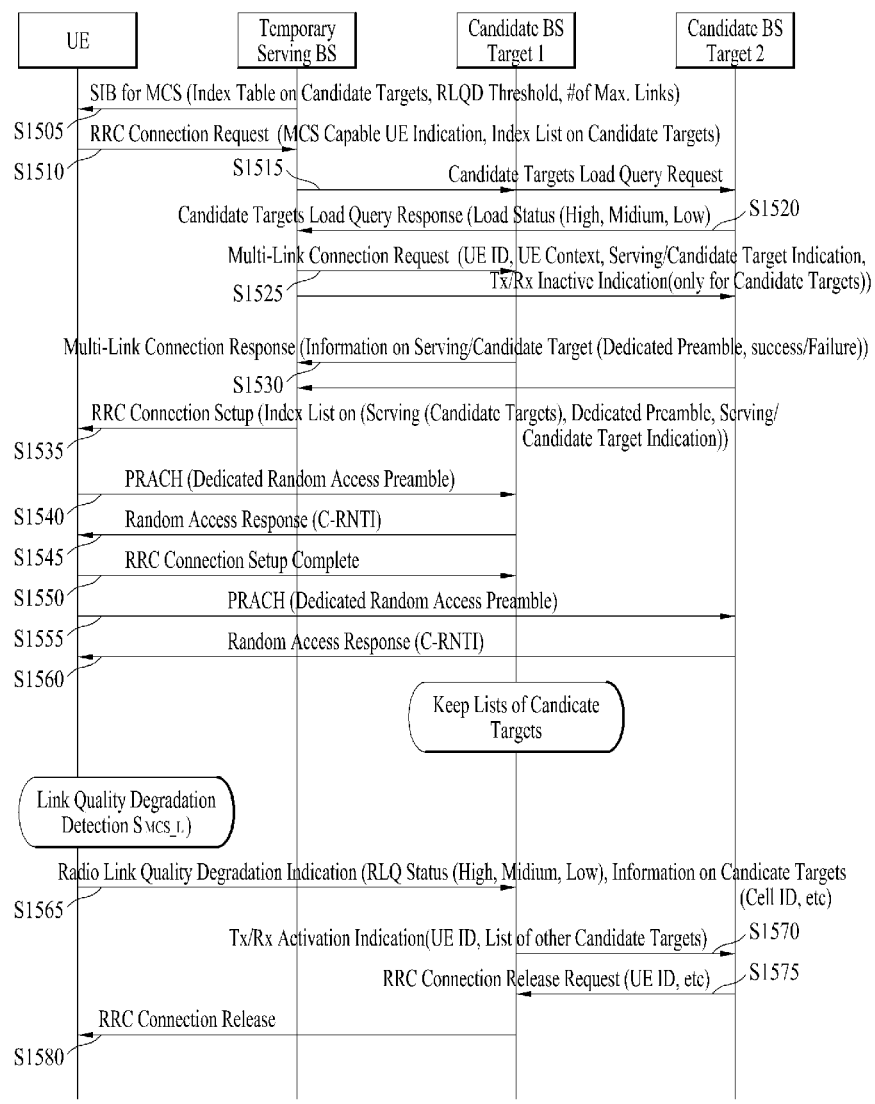
FIG. 15 is a flowchart for an initial access procedure of a user equipment according to a further different embodiment of the present invention.

FIG. 15 is a flowchart for an initial access procedure of a user equipment according to one embodiment of the present invention. Explanation on contents overlapped with the aforementioned contents is omitted.

A user equipment receives system information for MCS from a temporary serving base station [S1505]. The user equipment transmits an RRC connection request message to the temporary serving base station [S1510]. The temporary serving base station transmits a load query request to each of candidate base stations [S1515]. The temporary serving base station receives a load query response from each of the candidate base stations [S1520]. The temporary serving base station transmits a multi-link connection request to the candidate base stations in consideration of a load status of each of the candidate base stations [S1525]. The temporary serving base station receives a multi-link connection response from the candidate base stations [S1530].

In the embodiment of FIG. 15, assume that a first candidate base station rather than the temporary serving base station becomes a serving base station of the user equipment. Moreover, assume that all candidate base stations have accepted the multi-link connection request. In particular, the candidate base stations become alternative link base stations of the user equipment.

If synchronization between base stations is not matched, it is necessary for the user equipment to perform synchronization with candidate base stations to configure an alternative link or a serving link. Hence, the user equipment transmits a user equipment-dedicated random access preamble to candidate base stations with which an alternative link or a serving link is configured [S1545/S1555]. The user equipment receives a random access response message from each of the candidate base stations [S1545/S1560]. If synchronization between base stations is matched, the synchronization procedure can be omitted.

The temporary serving base station transmits an RRC connection configuration message to the user equipment [S1535]. The user equipment transmits an RRC connection configuration completion message to the first candidate base station corresponding to the serving base station of the user equipment [S1550]. If radio link quality degradation is detected, the user equipment transmits an RLQD indication message to the serving base station [S1565].

The serving base station transmits a Tx/Rx activation indication and a list of other candidate base stations to a predetermined candidate base station [S1570]. The predetermined candidate base station transmits an RRC connection release request to the serving base station [S1575]. The serving base station releases an RRC connection with the user equipment [S1580].

It is impossible to quickly switch to an alternative link using a legacy RLF control method. On the contrary, according to the present invention, it is able to secure an alternative link in advance before reception signal quality is deteriorated by performing a procedure for switching a link before the reception signal quality is deteriorated. If the user equipment is in control of configuring and updating a connection for alternative links, it is able to secure service availability sufficient enough for receiving MCSs. If the user equipment detects a PER change of a surrounding channel and determines an optimized alternative link via the proposed method, it is able to satisfy both a short delay requirement and a high reliability requirement at the same time. By doing so, it is able to quickly cope with an RLF, implement highly reliable connectivity, and improve a data rate for receiving MCSs.

Figure 16:
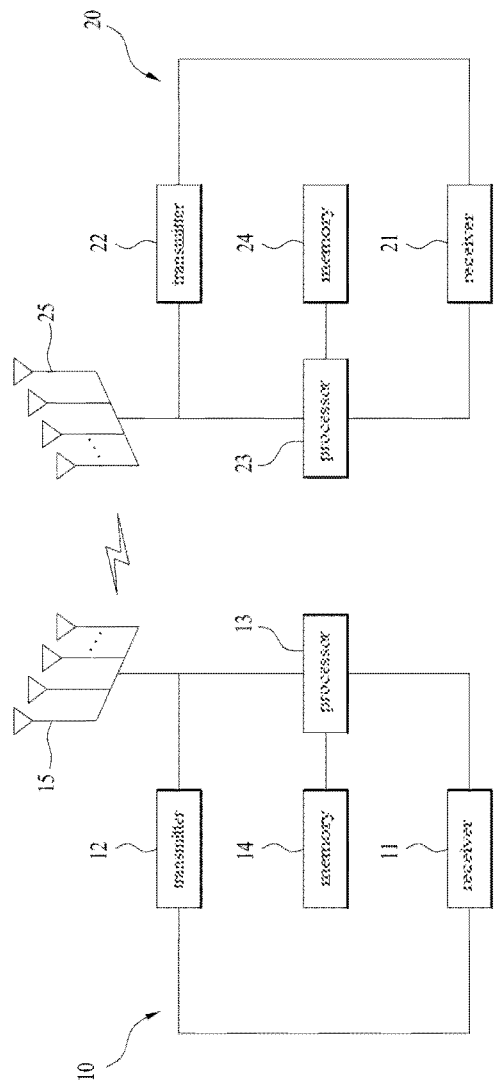
FIG. 16 is a diagram for a user equipment and a base station according to one embodiment of the present invention.

FIG. 16 is a diagram for structures of a user equipment and a base station according to one embodiment of the present invention. The base station may correspond to a fixed cell or a moving cell. Each of the user equipment and the base station shown in FIG. 16 can perform the aforementioned methods.

Referring to FIG. 16, a base station 10 can include a reception module 11, a transmission module 12, a processor 13, a memory 14 and a plurality of antennas 15. A plurality of the antennas 15 correspond to a base station supporting MIMO transmission and reception. The reception module 11 can receive various signals, data and information from the user equipment in UL. The transmission module 12 can transmit various signals, data and information to the user equipment in DL. The processor 13 can control overall operation of base station 10.

The reception module 13 of the base station 10 may operate as a reception module of a backhaul link or a reception module of an access link. The transmission module 12 may operate as a transmission module of a backhaul link or a transmission module of an access link.

Besides, the processor 13 of the base station 10 performs a function of calculating and processing information received by the base station 10, information to be transmitted to the external and the like. The memory 14 can store processed information for predetermined time and can be replaced with such a configuration element as a buffer (not depicted).

Referring to FIG. 16, a user equipment 20 can include a reception module 21, a transmission module 22, a processor 23, a memory 24 and a plurality of antennas 25. A plurality of the antennas 25 correspond to a user equipment supporting MIMO transmission and reception. The reception module 21 can receive various signals, data and information from the base station in DL. The transmission module 22 can transmit various signals, data and information to the base station in UL. The processor 23 can control overall operation of the user equipment 20.

Besides, the processor 23 of the user equipment 20 performs a function of calculating and processing information received by the user equipment 20, information to be transmitted to the external and the like. The memory 24 can store processed information for predetermined time and can be replaced with such a configuration element as a buffer (not depicted).

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, the embodiments of the present invention are applicable to various kinds of mobile communication systems.

What is claimed is:

1. A method of searching for an alternative link by a user equipment in a wireless communication system, the method comprising:
    receiving service information including a target quality value of a service to be provided to the user equipment from a serving link base station;
    determining whether to search for a first alternative link based on a scheduling reference quality value to be used for scheduling the user equipment by the serving link base station at a future time and at the target quality value;
    searching for candidate base stations to configure the first alternative link upon determining to search for the first alternative link; and
    establishing the first alternative link with a first candidate base station among the searched candidate base stations in a mode in which unicast data transmission/reception is deactivated,
    wherein searching for the candidate base stations further comprises:
        comparing a log value of the target quality value with a log sum of a quality value obtained from the candidate base stations and the scheduling reference quality value; and
        reporting, to the serving link base station, a result of the comparison and a list of candidate base stations of which the log sum is equal to or less than the log value of the target quality value,
        wherein the first candidate base station is selected from the list of the candidate base stations.

2. The method of claim 1, wherein the scheduling reference quality value corresponds to a packet error rate (PER) which is determined according to a result of estimating a buffer status of the serving link base station at the future time, or an amount of resource blocks (RBs) to be allocated to the user equipment.

3. The method of claim 1, further comprising:
    receiving an indicator indicating the future time at which the scheduling reference quality value is to be applied, and the scheduling reference quality value.

4. The method of claim 1, wherein determining whether to search for the first alternative link comprises determining to search for the first alternative link when the scheduling reference quality value exceeds the target quality value.

5. The method of claim 1, wherein the service information comprises identifiers of a plurality of services containing the service to be provided to the user equipment, a target quality value of each of the plurality of services, and a table to which a minimum quality value of each of the plurality of services is mapped.

6. The method of claim 1, further comprising:
    releasing a connection with the serving base station and activating the unicast data transmission/reception of the first alternative link when the scheduling reference quality value exceeds a minimum quality value of the service.

7. The method of claim 1, further comprising:
    searching for candidate base stations to configure a second alternative link when a log sum of the scheduling reference quality value of the serving link base station and a quality value obtained from the first candidate base station exceeds the target quality value; and
    establishing the second alternative link with a second candidate base station among the searched candidate base stations to configure the second alternative link in the mode in which the unicast data transmission/reception is deactivated.

8. The method of claim 1, further comprising:
    releasing the first alternative link from the first candidate base station when a quality value obtained from the first candidate base station exceeds a minimum quality value of the service.

9. A method of supporting a user equipment to search for an alternative link by a serving link base station in a wireless communication system, the method comprising:
    receiving a radio resource control (RRC) connection request message from the user equipment;
    transmitting, to the user equipment, service information containing a target quality value of a service to be provided to the user equipment if the RRC connection request message indicates that the user equipment supports predetermined services;
    determining a scheduling reference quality value to be used for scheduling the user equipment at a future time according to a result of estimating a buffer status at the future time; and
    transmitting an indicator indicating the determined scheduling reference quality value and the future time to the user equipment,
    wherein the search of the alternative link of the user equipment is triggered based on the target quality value and the scheduling reference quality value.

10. The method of claim 9, wherein the service information comprises identifiers of the predetermined services, a target quality value of each of the predetermined services, and a table to which a minimum quality value of each of the predetermined services is mapped.

11. The method of claim 9, further comprising:
    receiving a list of candidate base stations to configure the alternative link,
    wherein a log sum of quality values provided by the candidate base stations and the scheduling reference quality value is equal to or less than a log value of the target quality value.

12. The method of claim 11, further comprising:
    transmitting an alternative link configuration request to the candidate base stations to request the candidate base stations to establish a first alternative link with the user equipment;
    receiving, from the candidate base stations, an indicator indicating whether or not the first alternative link can be configured and an alternative link configuration response containing service information of the candidate base stations; and
    transmitting the alternative link configuration response to the user equipment.

13. The method of claim 9, further comprising:
    receiving an identifier of the user equipment and a message containing an indicator indicating configuration of a first alternative link, from a first candidate base station which has established the first alternative link with the user equipment in the mode in which unicast data transmission/reception is deactivated.

14. A user equipment searching for an alternative link in a wireless communication system, comprising:

a receiver configured to receive service information including a target quality value of a service to be provided to the user equipment from a serving link base station; and a processor, operatively coupled to the receiver, configured to determine whether to search for a first alternative link based on a scheduling reference quality value to be used for scheduling the user equipment by the serving link base station at a future time and the target quality value, to search for candidate base stations to configure the first alternative link upon determining to search for the first alternative link, and to establish the first alternative link with a first candidate base station among the searched candidate base stations in a mode in which unicast data transmission/reception is deactivated, wherein the processor is further configured to:
  compare a log value of the target quality value with a log sum of a quality value obtained from the candidate base stations and the scheduling reference quality value, and
  report to the serving link base station, a result of the comparison and a list of candidate base stations of which the log sum is equal to or less than the log value of the target quality value,
  wherein the first candidate base station is selected from the list of the candidate base stations.

* * * * *